(12) United States Patent
Yu et al.

(10) Patent No.: US 8,634,105 B2
(45) Date of Patent: Jan. 21, 2014

(54) THREE COLOR NEUTRAL AXIS CONTROL IN A PRINTING DEVICE

(75) Inventors: Shenbo Yu, Andover, MA (US); Gang Dong, Westford, MA (US); Takuya Katayama, North Andover, MA (US)

(73) Assignee: CSR Imaging US, LP, Burlington, MA (US)

( * ) Notice: Subject to any disclaimer, the term of this patent is extended or adjusted under 35 U.S.C. 154(b) by 0 days.

(21) Appl. No.: 13/242,385

(22) Filed: Sep. 23, 2011

(65) Prior Publication Data

US 2012/0307266 A1   Dec. 6, 2012

Related U.S. Application Data

(60) Provisional application No. 61/493,594, filed on Jun. 6, 2011.

(51) Int. Cl.
   *H04N 1/60*  (2006.01)
(52) U.S. Cl.
   USPC ............................................. 358/1.9; 358/518
(58) Field of Classification Search
   None
   See application file for complete search history.

(56) References Cited

U.S. PATENT DOCUMENTS

| | | | | |
|---|---|---|---|---|
| 6,172,681 B1 * | 1/2001 | Ueda | ............................. | 345/589 |
| 6,302,521 B1 * | 10/2001 | Ellson et al. | ..................... | 347/43 |
| 6,335,734 B1 * | 1/2002 | Nagae et al. | ................... | 345/589 |
| 6,778,300 B1 * | 8/2004 | Kohler | ........................... | 358/529 |
| 6,972,866 B1 * | 12/2005 | Bares et al. | ..................... | 358/1.9 |
| 7,206,100 B2 * | 4/2007 | Namikata | ..................... | 358/3.23 |
| 7,246,880 B2 * | 7/2007 | Ross et al. | ...................... | 347/43 |
| 7,369,271 B2 * | 5/2008 | Itagaki | ............................ | 358/1.9 |
| 7,583,420 B2 * | 9/2009 | Namikata | ...................... | 358/518 |
| 7,656,554 B2 * | 2/2010 | Deer et al. | ...................... | 358/1.9 |
| 2003/0206307 A1 | 11/2003 | Handley et al. | | |
| 2004/0257621 A1 * | 12/2004 | Ishihara | ......................... | 358/2.1 |
| 2007/0171442 A1 | 7/2007 | Granger | | |
| 2010/0103466 A1 * | 4/2010 | Kang | ........................... | 358/3.06 |
| 2010/0225939 A1 | 9/2010 | Gil et al. | | |

* cited by examiner

*Primary Examiner* — Dung Tran
(74) *Attorney, Agent, or Firm* — Lando & Anastasi, LLP

(57) ABSTRACT

A color printing method includes converting source color data to intermediate color data represented in a device independent color space using a first multidimensional gamut mapping of the first device dependent color space to the device independent color space. The device independent color space has a neutral color component. The method further includes converting the intermediate color data to destination color data represented in a second device dependent color space using a second multidimensional gamut mapping of the device independent color space to the second device dependent color space. The second device dependent color space has three primary color components and a virtual black color component defined by substantially equal tonal values of the three primary color components. The second multidimensional gamut mapping includes a mapping from the neutral color component of the device independent color space to the virtual black color component of the second device dependent color space.

20 Claims, 4 Drawing Sheets

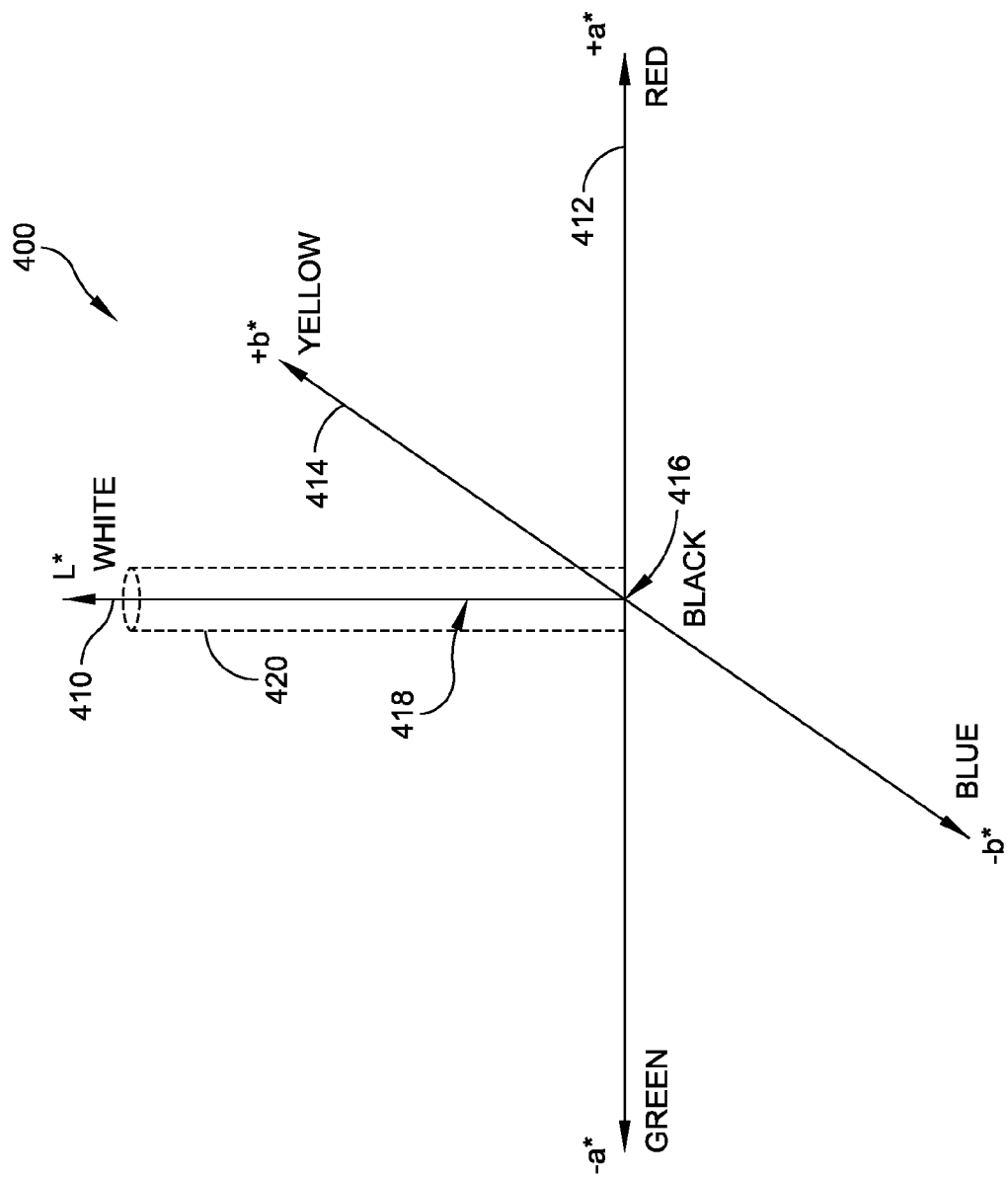

THREE COLOR NEUTRAL AXIS CONTROL IN A PRINTING DEVICE

CROSS-REFERENCE TO RELATED APPLICATIONS

This application claims priority under 35 U.S.C. §119(e) to U.S. Provisional Application Ser. No. 61/493,594, entitled "Three Color Neutral Axis Control in a Printing Device," filed on Jun. 6, 2011, which is herein incorporated by reference in its entirety.

BACKGROUND OF THE INVENTION

Embodiments of the present invention relate generally to digital color printing, and more particularly, to systems and methods of color conversion for digital color printing.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 4 illustrates axes showing an L*a*b* color space in accordance with one embodiment.

DETAILED DESCRIPTION OF THE INVENTION

Figure 1:
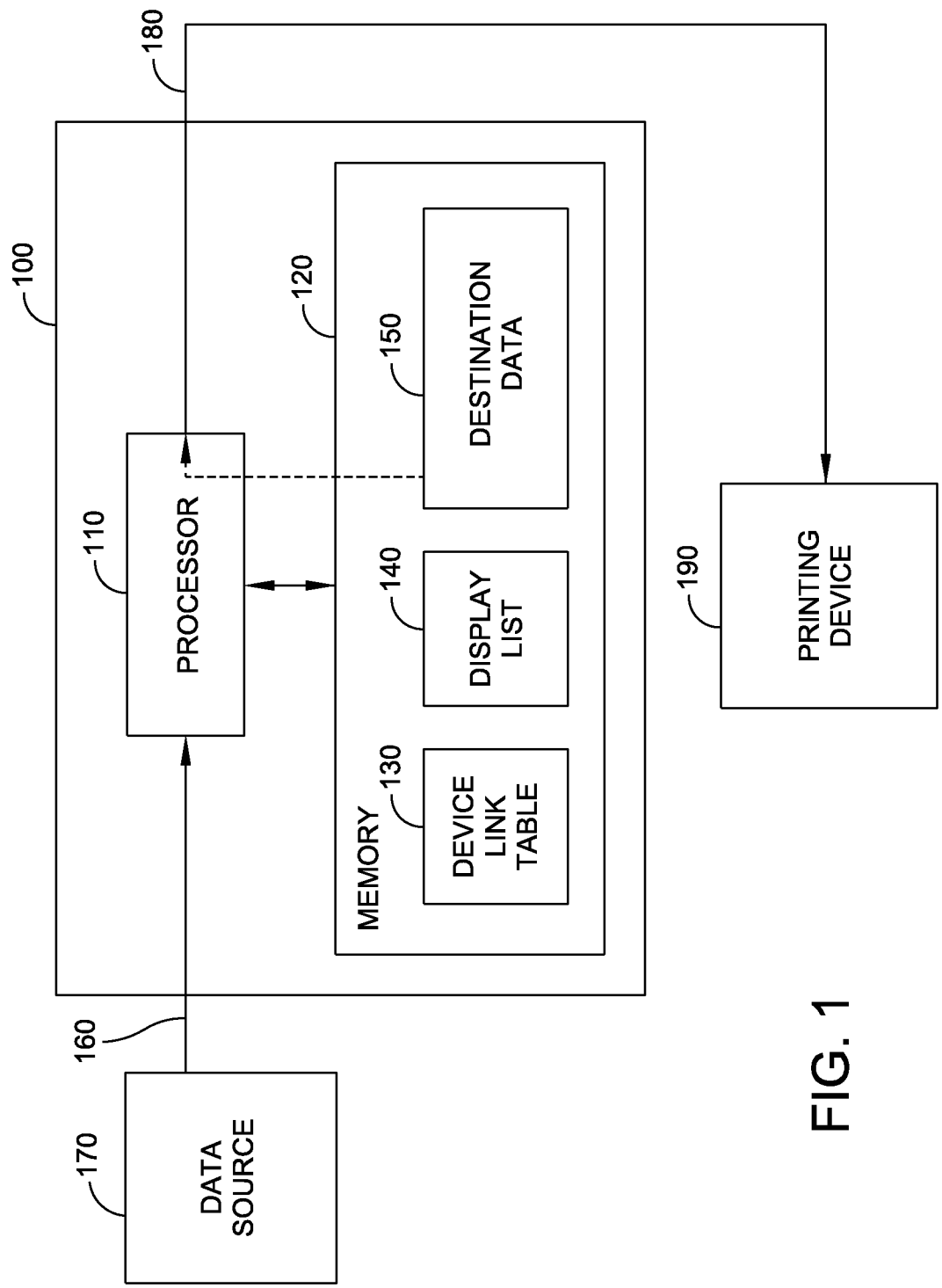
FIG. 1 is a functional block diagram of a color printing system in accordance with one embodiment.

According to one embodiment, a color printing method includes receiving source color data represented in a first device dependent color space, converting, by at least one image processing device, the source color data to intermediate color data represented in a device independent color space using a first multidimensional gamut mapping of the first device dependent color space to the device independent color space, the device independent color space having a neutral color component, and converting, by the at least one image processing device, the intermediate color data to destination color data represented in a second device dependent color space using a second multidimensional gamut mapping of the device independent color space to the second device dependent color space. The second device dependent color space has three primary color components and a virtual black color component defined by substantially equal tonal values of each of the three primary color components. The second multidimensional gamut mapping includes a mapping from the neutral color component of the device independent color space to the virtual black color component of the second device dependent color space.

In another embodiment, the source color data may represents a source vector graphic object type, a source text object type, and/or a source raster graphic object type. The method may include, for source color data corresponding to the virtual black color component, screening a first portion of the destination color data representing the source text object type into gray halftone data, and screening a second portion of the destination color data excluding the first portion into color halftone data. In yet another embodiment, the method may include rendering the gray halftone data into at least one pure black output pixel to be printed using a black colorant, and rendering the color halftone data into at least one process black output pixel to be printed using at least one non-black colorant.

In another embodiment, the source color data may include printer definition language (PDL) instructions. The method may include interpreting the PDL instructions. In yet another embodiment, the PDL includes PCL 5 and/or PCL 6. In yet another embodiment, rendering the gray halftone data may include performing a three-color rendering operation (ROP3) on at least a portion of the gray halftone data. In yet another embodiment, rendering the color halftone data may include performing the ROP3 on at least a portion of the color halftone data.

In another embodiment, the method may include measuring tonal values of a first plurality of printed neutral color pure black output pixels and a second plurality of printed neutral color process black output pixels, comparing each of the measured tonal values to a predetermined scale of neutral color tonal values, and adjusting the mapping from the neutral color component of the device independent color space to the virtual black color component of the second device dependent color space in the second multidimensional gamut mapping based on the comparison.

In another embodiment, the first multidimensional gamut mapping may include a first three-dimensional look-up table (LUT), and the second multidimensional gamut mapping may include a second three-dimensional LUT. In yet another embodiment, the first three-dimensional LUT may include an RGB color space to L*a*b* color space LUT, and the second three-dimensional LUT may include an L*a*b* color space to CMY color space LUT.

In another embodiment, converting the source color data to the intermediate color data and converting the intermediate color data to destination color data may be performed by accessing a three-dimensional LUT corresponding to a concatenation of the first multidimensional gamut mapping and the second multidimensional gamut mapping. For example, the first multidimensional gamut mapping may include a mapping from an RGB color space to an L*a*b* color space, and the second multidimensional mapping may include a mapping from an L*a*b* color space to a CMY color space. Thus, the three-dimensional LUT may represent a mapping from RGB to L*a*b* to CMY. Further, in this embodiment, the acts of converting the source color data to the intermediate color data and converting the intermediate color data to the destination color data may be effectively combined by using the three-dimensional LUT described above instead of using more than one LUT to achieve similar results.

In yet another embodiment, the three-dimensional LUT may correspond to a device link table including an RGB color space to CMY color space mapping, where the RGB to CMY color space mapping includes a virtual black color component, such as described above.

According to one embodiment, a computer readable medium includes computer-executable instructions that when executed on at least one processor perform at least a portion of the method described above.

According to one embodiment, a color printing system includes a source data input for receiving source color data represented in a first device dependent color space, a destination data output for providing destination color data represented in a second device dependent color space having three primary color components and a virtual black color component defined by substantially equal tonal values of each of the three primary color components, and a memory for storing a first multidimensional gamut mapping of the first device dependent color space to a device independent color space having a neutral color component, and a second multidimensional gamut mapping of the device independent color space to the second device dependent color space. The second multidimensional gamut mapping includes a mapping from the neutral color component of the device independent color space to the virtual black color component of the second device dependent color space. The color printing system further includes at least one processor coupled to the memory. The at least one processor includes a first processor and a second processor each coupled to the memory. The first processor is configured to convert the source color data to intermediate color data represented in the device independent color space using the first multidimensional gamut mapping, and the second processor is configured to convert the intermediate color data to the destination color data using the second multidimensional gamut mapping.

In another embodiment, the source color data may represent a source vector graphic object type, a source text object type, and/or a source raster graphic object type. The at least one processor may include a third processor coupled to the memory and configured to, for source color data corresponding to the virtual black color component, screen a first portion of the destination color data representing the source text object type into gray halftone data, and screen a second portion of the destination color data excluding the first portion into color halftone data.

In another embodiment, the third processor may be configured to render the gray halftone data into at least one pure black output pixel to be printed using a black colorant, and render the color halftone data into at least one process black output pixel to be printed using at least one non-black colorant. In yet another embodiment, the at least one processor may be further configured to set at least one K bit, stored in the memory and associated with the at least one pure black output pixel, to ON and reset at least one CMY bit, stored in the memory and associated with the at least one pure black output pixel, to OFF, and set at least one CMY bit, stored in the memory and associated with the at least one process black output pixel, to ON and reset at least one K bit, stored in the memory and associated with the at least one process black output pixel, to OFF.

In another embodiment, the source color data may include printer definition language (PDL) instructions. The PDL may include PCL 5 and/or PCL 6. The at least one processor may be further configured to interpret the PDL instructions.

In another embodiment, the at least one processor may be further configured to perform a three-color rendering operation (ROP3) on at least a portion of the gray halftone data, and perform the ROP3 on at least a portion of the color halftone data.

In another embodiment, the at least one processor may be further configured to adjust the mapping from the neutral color component of the device independent color space to the virtual black color component of the second device dependent color space in the second multidimensional gamut mapping based on a comparison to be performed between measured tonal values of each of a first plurality of printed neutral color pure black output pixels and a second plurality of printed neutral color process black output pixels, and a predetermined scale of neutral color tonal values.

In another embodiment, the first multidimensional gamut mapping may include a first three-dimensional look-up table (LUT), and the second multidimensional gamut mapping may include a second three-dimensional LUT. In yet another embodiment, the first three-dimensional LUT may include an RGB color space to L*a*b* color space LUT, and the second three-dimensional LUT may include an L*a*b* color space to CMY color space LUT.

In another embodiment, the processor may be configured to convert the source color data to the intermediate color data and convert the intermediate color data to destination color data by accessing a three-dimensional LUT corresponding to a concatenation of the first multidimensional gamut mapping and the second multidimensional gamut mapping. For example, the first multidimensional gamut mapping may include a mapping from an RGB color space to an L*a*b* color space, and the second multidimensional mapping may include a mapping from an L*a*b* color space to a CMY color space. Thus, the three-dimensional LUT may represent a mapping from RGB to L*a*b* to CMY. Further, in this embodiment, the acts of converting the source color data to the intermediate color data and converting the intermediate color data to the destination color data may be effectively combined by using the three-dimensional LUT described above instead of using more than one LUT to achieve similar results.

In yet another embodiment, the three-dimensional LUT may correspond to a device link table including an RGB color space to CMY color space mapping, where the RGB to CMY color space mapping includes a virtual black color component, such as described above.

Embodiments of the invention are not limited in their application to the details of construction and the arrangement of components set forth in the following description or illustrated in the drawings. Embodiments of the invention are capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Color images displayed by a light-emitting device, such as a computer monitor or television, are typically represented as an additive color space. The most common additive color space is RGB, which has red, green, and blue color components that can be combined to create a wide range of colors. Neutral colors include monochrome, black-and-white and/or grayscale colors (e.g., R=G=B). Color data can also be represented in a multidimensional, device independent color space, such as CIE 1976 (L*a*b*) (Commission Internationale de L'eclairage color standard), referred to as CIELAB, CIE 1976 (L*u*v*) (CIELUV), or other device independent luminance/chrominance color spaces including CIE LCh and/or CIEJab. Depending on the color space, coordinates on the L* axis (e.g., CIELAB, CIELUV) or J axis (e.g., CIE JCh), also called the neutral axis, represent lightness or luminance. Neutral colors are on or near the neutral axis.

By contrast, printed color images are produced using dyes or colorants in toner or ink that absorb or subtract wavelengths from filtered or reflected light. One subtractive color space used for digital printing is CMYK (cyan-magenta-yellow-black). To the human eye, color images printed using CMYK should appear similar to color images displayed using RGB. The subtractive color space may be device dependent; that is, the subtractive color space is adapted for printing color images, text and other graphics on a particular printing device using a combination of different dyes or colorants. For example, color pixels may be rendered on a color printer from CMYK color image data using non-black colorants including cyan, magenta, and yellow colorants for the CMY color components, respectively, and a black colorant for the K (black) color component. In four-color printing (e.g., CMYK), neutral colors may be produced using the black (K) colorant or approximately equal combinations of CMY colorants.

Typically, the color data is associated with a color definition that is used in conjunction with printer calibration results to create a color conversion or transformation table. One conventional technique for printing a digital document includes converting or mapping color data in a source color space (e.g., RGB) to a printer or destination color space (e.g., CMYK) using several data transformations. The printer color calibration may be used, for example, to correct the color mapping from a device independent color space (e.g., CIELAB, CIE LCh, CIELUV, CIEJab, etc.) to a device dependent color space (e.g., CMYK space). The color conversion table may be, for example, a three-dimensional lookup table (LUT) for translating color data from one color space into another (e.g., from RGB to CIELAB, or from CIELAB to CMYK). The LUT may have a sparse grid, such as 17×17×17, and therefore the conversion may involve some interpolation. The color data in the destination color space are rendered as pixels with the correct colors for printing on a particular type of media (e.g., paper).

Neutral colors are typically rendered as pure black pixels that are printed with a black colorant. Pure black printing provides high black letter text quality and is less costly than multi-color printing. In one conventional neutral axis control technique, neutral colors in CIELAB color space (i.e., colors along the L* axis) are converted to the black (K) component of CMYK color space, or are converted during a color separation step that includes generating black pixels using color removal.

However, neutral colors can alternatively be rendered as a CMY color called process black, which is printed using a combination of cyan, magenta, and yellow. Equal tonal values of cyan, magenta, and yellow produce a range of grayscale colors between white and black. As used in this disclosure, "virtual black" includes CMY color components that have equal or substantially equal tonal values (e.g., $G \approx M \approx Y$).

According to one aspect of the disclosure, neutral colors may be rendered as either pure black or process black. Neutral color rendering may be object-based. For example, text objects in the source data may be rendered as pure black, while other objects in the source data, such as vector graphic objects or image objects, may be rendered as process black.

Conventionally, color conversion is performed by a raster image processor (RIP) in a color printer. The RIP is a component of the printer that produces the raster image or bitmap from the source data. The source data may include a color page description in a page description language (PDL) such as Adobe PostScript, Hewlett-Packard Printer Command Language (PCL), Portable Document Format (PDF), Microsoft XPS (XML Paper Specification), or other high-level languages. PDL source color data typically includes text, vector graphics, and/or image objects, although other object types, such as shading objects, may also be included. The RIP interprets PDL instructions in the source color data to generate a display list. The display list includes a series of graphic commands that define an output image. A continuous tone bitmap is rendered by executing the commands in the display list. The bitmap is then converted into a halftone for printing using a conventional screening or halftoning process.

As discussed above, some well-known PDLs include Adobe PostScript, HP PCL 5/PCL 6, and Microsoft XPS. Different color models and rendering processing may be used in each PDL. For example, PCL 5/PCL 6 uses a three color raster (logical) operation (ROP3) to define how a pattern, source image, and destination image are applied to each other using the print model's transparent and opaque modes to produce an output image. In one conventional technique, HP PCL 5/PCL 6 specifies that the raster operation be performed on the source image, the destination image, and the texture in RGB color space. Then the RGB raster data is converted to a CMYK printer dependent color space. Because each pixel on the rendered page has to be converted, the color conversion process is computationally very expensive, and typically is performed by a hardware accelerator.

According to one aspect, it is appreciated that color conversion may be performed in either the source color space or the destination, or output, color space. Typically, the resolution of the source color data is smaller than the destination color data. Because the source color data has a smaller resolution, color conversion computations are generally more efficient in the source color space than in the destination color space. For example, there are approximately 6600×5100, or 33.66 million pixels on a typical 8½×11 inch letter size (A size) sheet printed at 600 dots per inch (dpi). Thus, if the source page has only one color, color conversion in the source color space only needs to be performed at one pixel for a source vector, but color conversion in the destination color space needs to be performed for each of the 33.66 million pixels for a destination raster.

In one conventional technique, color conversion is performed as follows: (1) the source image data in RGB color space is converted to a device (e.g., printer) dependent RGB color space, then (2) to a device dependent CMY color space, then (3) to CMYK using black generation and under color removal for object-based neutral axis control. The resulting image data in the CMYK color space is then (4) converted to the CMY color space and subsequently rendered for printing using ROP3. During rendering CMY is translated to CMYK for four color printing (i.e., cyan, magenta, yellow, and black). The four color conversion steps are computationally intensive. Furthermore, the color conversions from CMYK to CMY and from CMY to CMYK are not invertible, and therefore image quality can be compromised.

According to one embodiment, neutral axis control for CMYK output color is performed during color conversion from RGB color space to CMY color space. The RGB color space is converted directly to CMY color space in the source pixel domain (e.g., in the form of a text object, a vector graphic object, and/or a source image object). The color conversion from RGB to CMY includes a device link table (e.g., a three-dimensional transformation LUT) and neutral axis control. The device link LUT combines a source RGB color definition, for example, standard RGB (sRGB) or Adobe RGB 1998, and a CMY color definition for the printer. The device color definition may be an ICC profile (International Color Consortium), or a sequence of matrices and lookup tables. The device color definition specifies a mapping between a device independent color space (e.g., CIELAB) and the device dependent color space (e.g., CMY). For a bitonal or multilevel printer, the CMY data is screened to a halftone. For PCL 5 and PCL 6, ROP3 is then applied to the halftone data to produce a raster image or bitmap.

In one embodiment, color conversion is performed according to the following color path: (1) the source data in RGB color space is converted (using, for example, PCL 5 emulation and PCL 6 emulation) to destination data in a device (e.g., printer) dependent CMY color space, using a device link (i.e., a LUT) with neutral axis control, i.e., with neutral colors being mapped to the virtual black component of the CMY color space. The destination data is then (2) screened into a halftone and rendered (e.g., using ROP3) into a bitmap for printing. The virtual black component of the destination data may be rendered as pure black or process black, for example, based on the object type of the corresponding source data. For example, text objects may be rendered as pure black, and other object types may be rendered as process black, although it should be understood that other rendering techniques may be used. The color path may be implemented in hardware, or in software that is executed on one or more processors.

FIG. 1 is a functional block diagram of a color printing system 100 according to one embodiment. The system 100 includes a processor 110 coupled to a memory 120. The memory 120 may be used to store, among other things, a device link table 130, a display list 140, and destination data 150. The system 100 (e.g., the processor 110) receives source data 160 from a data source 170, and provides rendered data 180 to a printing device 190. Examples of the data source 170 include computers, digital cameras, camcorders, handheld devices, scanners, or other devices capable of providing text or image data. As used in this disclosure, image data refers to any data representing text, graphics, photographs, or other data, in any format including raw or structured. The processor 110 may include, for example, a PowerPC® processor manufactured by IBM Corporation of Armonk, N.Y., an ARM-based processor, a proprietary processor, or other suitable type of processor. The printing device 190 may include a peripheral device that produces text and/or graphics from the rendered data 180 on a hardcopy medium (e.g., toner-based printers, inkjet printers, dye-sublimation printers, thermal printers, dot matrix printers, ultraviolet printers, etc.). In some embodiments, the system 100 is implemented in the printing device 190, although the system 100 and the printing device 190 may be separate components.

As described in further detail below, the device link table 130 includes, according to one embodiment, at least one multidimensional LUT used for conversion of the source data 160 to destination data 150 (e.g., a three-dimensional transformation LUT).

Figure 2:
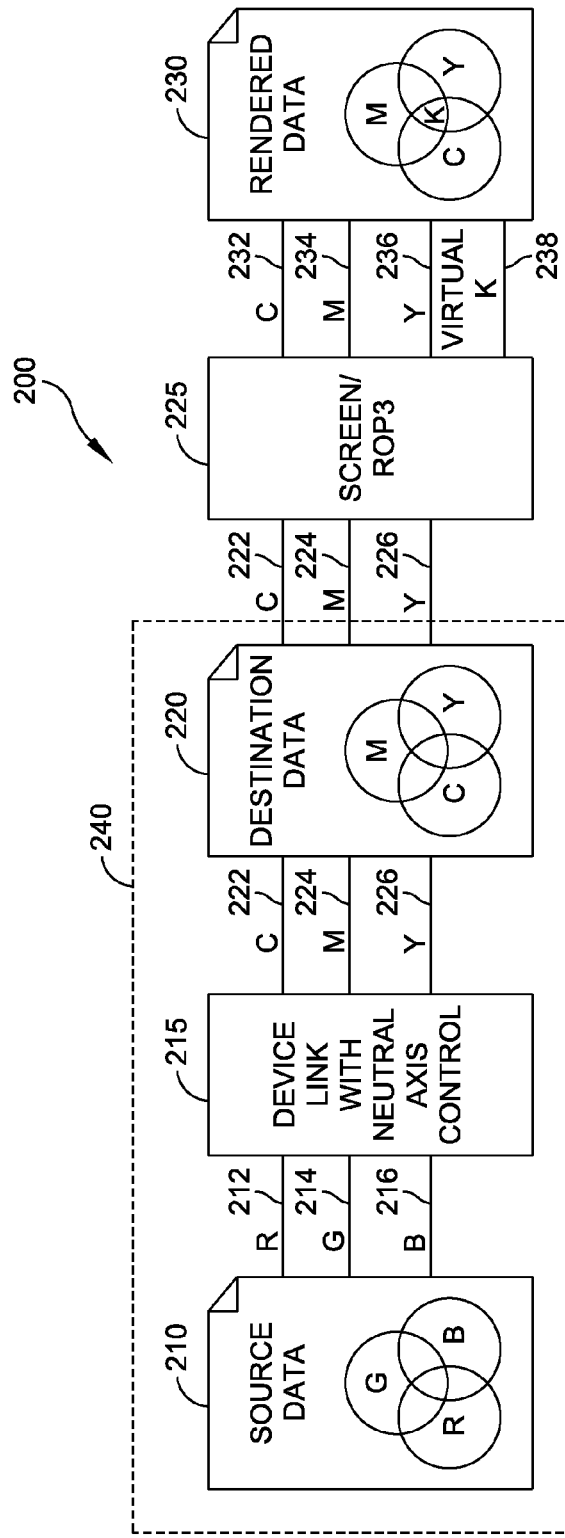
FIG. 2 is a data flow diagram showing a color conversion path for processing image data in accordance with one embodiment.

FIG. 2 is a data flow diagram showing a color conversion path 200 for processing image data with the system 100 of FIG. 1, according to one embodiment. Source color image data 210, which is device dependent and may be included in the source data 160 of FIG. 1, is presented in the RGB color space. The source color image data 210 represents three primary color components: red, green, and blue, as shown in FIG. 2, and may, for example, include PCL 5 or PCL 6 data. The source color image data 210 is first converted into destination color image data 220 in a device independent CMY color space, which includes three primary color components cyan, magenta, and yellow. In a portion 240 of the color conversion path 200, the RGB source color image data 210 is mapped to the CMY destination color image data 220 using at least one LUT, referred to as a device link with neutral axis control 215, as described below with respect to FIG. 3.

The CMY destination color image data 220 is subsequently screened to halftone image data. The halftone image data is then rendered into rendered data 230 including a bitmap using, for example, ROP3 (i.e., a three color raster operation). The rendered data 230 includes four color components CMY and virtual black (K), and is used by the printer to print the text or graphics represented by the rendered data.

Figure 3:
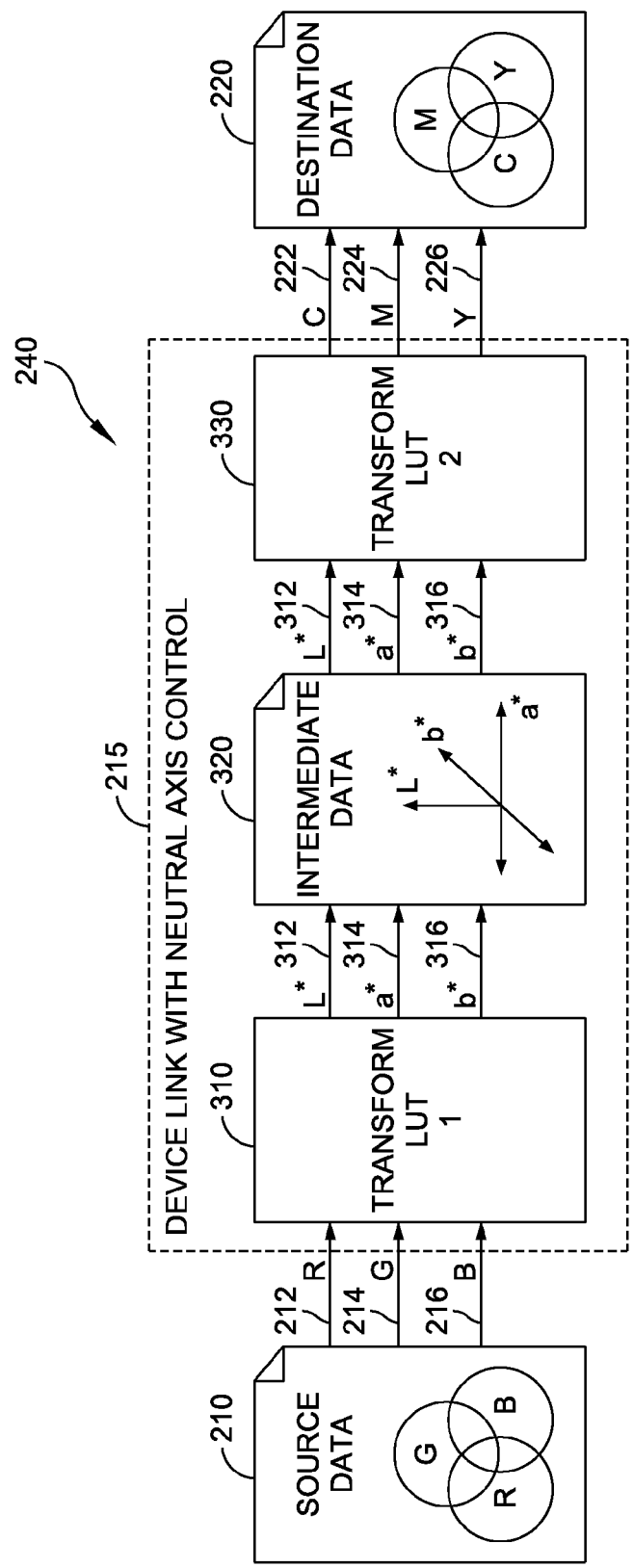
FIG. 3 is a data flow diagram showing a portion of the color conversion path of FIG. 2 in accordance with one embodiment.

FIG. 3 is a data flow diagram showing the portion 240 of the color conversion path 200 of FIG. 2, according to one embodiment, and more particularly, the device link with neutral axis control 215. As discussed above, the device link with neutral axis control 215 combines a source RGB color definition (e.g., sRGB or Adobe RGB 1998) and a printer CMY color definition to perform color conversion from RGB to CMY. The source data 210 in RGB color space is applied to a first multidimensional gamut mapping, or first transformation LUT 310, as three primary color components red 212, green 214, and blue 216. The first LUT 310 may be, for example, a three-dimensional LUT which provides a mapping between the color gamut of the source device color space (RGB) in the source pixel domain and the color gamut of a device independent color space such as CIELAB, CIELCH, CIELUV, CIE-Jab, or other device independent luminance/chrominance color spaces.

As discussed above, and as shown in FIG. 4, CIELAB is a multidimensional, device independent color space 400 having three color axes, L* 410, a* 412, and b* 414. According to one embodiment, the vertical L* axis 410, or neutral axis, represents lightness as a range of neutral colors between black (0) and white (100). The horizontal axes a* 412 and b* 414 are at right angles to each other and cross the neutral axis 410 at their respective centers. The a* axis 412 represents colors between red and green, and the b* axis 414 represents colors between yellow and blue. A point 416 at which the three axes 410, 412, and 414 intersect represents black. A point 418 at which the a* axis 412 and the b* axis 414 intersect the L* axis 410 above the point 416 represents a neutral, or grayscale, color between black and white. In another embodiment, other points within an imaginary cylinder 420 surrounding, but not necessarily on, the neutral axis 410 may also approximate neutral colors. Therefore, according to some embodiments, neutral colors may be defined as including points upon and surrounding the neutral axis 410.

In one embodiment, the neutral colors are rendered as pure black (e.g., such that they are printed with black toner or black ink), process black (e.g., using a combination of C, M, and Y colors), or both. Pure black colors include colors on the neutral axis 410, and process black colors include colors on the neutral axis and/or within the imaginary cylinder 420. For example, process black may be generated where C=M=Y (i.e., points along the neutral axis 410), or where C, M, and Y are substantially equal (i.e., points within the imaginary cylinder 420), because equal or substantially equal tonal values of cyan, magenta, and yellow have the appearance of gray approximating black.

Referring back to FIG. 3, the source data 210 in RGB color space is converted into intermediate data 320 in CIELAB space using the first transformation LUT 310. The result of the conversion is three color components L* 312, a* 314, and b* 316, where L* represents lightness (e.g., a neutral color), and a* and b* represent yellowness/blueness and redness/greenness, respectively.

The intermediate data 320 enters a second multidimensional gamut mapping, or second transformation LUT 330, as the three color components L* 312, a* 314, and b* 316. The second LUT 330 may be, for example, a three-dimensional LUT which provides a mapping between the color gamut of the device independent color space (CIELAB) and the color gamut of a device dependent color space CMY. The result of the conversion is three primary color components cyan 222, magenta 224, and yellow 226 that are part of the destination data 220. In addition to the three primary color components CMY is a virtual black color component (virtual K) that includes equal or substantially equal tonal values of the three primary color components. Colors near or along the neutral (L*) axis 410, as shown in FIG. 4, may be represented by values in a range from 0 to 100, where 0 is black and 100 is white. The virtual black component is the mapped printer CMY output of L*.

In the color path 200 of FIG. 2, according to one embodiment, the virtual black color component (virtual K) can be rendered as pure black or process black. Process black has the appearance of gray or black when substantially similar tonal values of cyan, magenta, and yellow are combined. Accordingly, virtual black may be rendered as CMY (for process black) or K only (for pure black). As discussed above, neutral color rendering may be object-based. For example, text objects in the source data may be rendered as pure black, while neutral colors of other objects in the source data, such as vector graphic or image objects, may be rendered as process black.

Referring to FIG. 2, the destination data 220 is screened and rendered into the rendered data 230 having three primary color components cyan 232, magenta 234, and yellow 236, and a virtual black component 238. After color conversion, the virtual black component 238 is assigned a gray halftone for pure black rendering and a color halftone for process black rendering (e.g., for a bitonal or multilevel printer). The gray halftone may, for example, include dot-on-dot screening in which only one screen is applied. A color halftone may, for example, include dot-off-dot screening in which multiple screens with different angles or different dot spatial distributions are applied.

During rendering, the gray halftone virtual black pixels are converted to pure black pixels, and the color halftone virtual black pixels are converted to process black pixels. For example, CMYK components in the rendered data 230 may each be represented as binary bits in memory for single bit printers (e.g., black-and-white) or multi-bit color printers. Setting each bit to ON represents the presence of the respective color component in the pixel, and setting each bit to OFF represents the absence of the color. For instance, if the CMY bits of the destination data 220 (i.e., the data prior to rendering) are all ON, the K bit of the corresponding pixel in the rendered data 230 is turned ON for pure black, and the CMY bits in the rendered data 230 are turned OFF. For process black, the K bit in the rendered data 230 is turned OFF and the CMY bits in the rendered data 230 are turned ON. For pure black pixels, only the black colorant is used. For process black pixels, the CMY colorants are used, although the black colorant may additionally or alternatively be used.

According to one embodiment, printer color calibration is similar to a calibration for a conventional CMY printer, except that an additional neutral axis calibration is used. For example, several patches (e.g., 13 to 25) are printed using different, known CMYK values. The color or L*a*b* values of each patch are measured (e.g., using a photometer) and inverted to create a mapping, or LUT, from CIELAB color space to CMY color space (e.g., the second LUT 330 described above with respect to FIG. 3). The neutral axis calibration includes printing several additional patches each having different virtual black tonal values for both pure black and process black. The L* value (e.g., in a range from 0 to 100) of each patch is measured (e.g., using a photometer). The corresponding L* value mapping in the LUT is adjusted accordingly. The color ramping in the LUT should be smooth as a result of the calibration.

In another embodiment, color conversion and neutral axis control for PCL 5 or PCL 6 emulation may be performed post-rendering. This technique uses four CMYK color planes of data and an object tagging plane of data. In yet another embodiment, neutral axis control is performed during source color conversion from RGB to CMYK, and rendering is performed using CMYK ROP. This embodiment includes a four-plane display list.

Some embodiments may be implemented in hardware, firmware, software, or in the form of instructions that are stored on a computer-readable medium (e.g., memory, hard disk, and so forth), which, when executed by one or more processors, cause the processor to perform the methods described herein, or methods having similar functionality to the methods described herein. The processor may be, for example, a general purpose processor, or an application-specific processor, such as is typically provided in commercial printers, or one of the processors described above.

In some embodiments, multiple processors may be used. For example, a first processor may be used to convert the source color data 210 to the intermediate data 320, and a second processor may be used to convert the intermediate data 320 to the destination data 220. In another example, a third processor may be used to screen and/or render the destination data 220 to the rendered data 230.

Having thus described several aspects of at least one embodiment of the invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A color printing method, comprising:
receiving source color data represented in a first device dependent color space, the source color data representing at least one of a source vector graphic object type, a source text object type, and a source raster graphic object type;
converting, by at least one image processing device, the source color data to intermediate color data represented in a device independent color space using a first multidimensional gamut mapping of the first device dependent color space to the device independent color space, the device independent color space having a neutral color component;
converting, by the at least one image processing device, the intermediate color data to destination color data represented in a second device dependent color space using a second multidimensional gamut mapping of the device independent color space to the second device dependent color space, the second device dependent color space having only three primary color components and including a virtual black color component defined by substantially equal tonal values of each of the three primary color components, the second multidimensional gamut mapping including a mapping from the neutral color component of the device independent color space to the virtual black color component of the second device dependent color space;
wherein for source color data corresponding to the virtual black color component, the method further comprises
screening a first portion of the destination color data representing the source text object type into gray halftone data including a single bit corresponding to each of the three primary color components of the second device dependent color space and a single bit corresponding to the virtual black color component;
screening a second portion of the destination color data excluding the first portion into color halftone data including a single bit corresponding to each of the three primary color components of the second device dependent color space and a single bit corresponding to the virtual black color component;
rendering the gray halftone data into at least one pure black output pixel to be printed using a black colorant; and rendering the color halftone data into at least one process black output pixel to be printed using at least one non-black colorant.

2. The method of claim 1, wherein the source color data includes printer definition language (PDL) instructions, and wherein the method further comprises interpreting the PDL instructions.

3. The method of claim 2, wherein the PDL includes at least one of PCL 5 and PCL 6.

4. The method of claim 3, wherein rendering the gray halftone data includes performing a three-color rendering operation (ROP3) on at least a portion of the gray halftone data.

5. The method of claim 4, wherein rendering the color halftone data includes performing the ROP3 on at least a portion of the color halftone data.

6. The method of claim 1, further comprising measuring tonal values of a first plurality of printed neutral color pure black output pixels and a second plurality of printed neutral color process black output pixels, comparing each of the measured tonal values to a predetermined scale of neutral color tonal values, and adjusting the mapping from the neutral color component of the device independent color space to the virtual black color component of the second device dependent color space in the second multidimensional gamut mapping based on the comparison.

7. The method of claim 1, wherein the first multidimensional gamut mapping includes a first three-dimensional look-up table (LUT), and wherein the second multidimensional gamut mapping includes a second three-dimensional LUT.

8. The method of claim 7, wherein the first three-dimensional LUT includes an RGB color space to L*a*b* color space LUT, and wherein the second three-dimensional LUT includes an L*a*b* color space to CMY color space LUT.

9. A non-transitory computer readable medium comprising computer-executable instructions that when executed by at least one processor perform the method according to claim 1.

10. The method of claim 1, wherein converting the source color data to the intermediate color data and converting the intermediate color data to destination color data are performed by accessing a concatenated three-dimensional look-up table (LUT) corresponding to a concatenation of the first multidimensional gamut mapping and the second multidimensional gamut mapping.

11. The method of claim 10, wherein the concatenated three-dimensional LUT is a device link table including an RGB color space to CMY color space LUT.

12. A color printing system, comprising:
a source data input for receiving source color data represented in a first device dependent color space, the source color data represents at least one of a source vector graphic object type, a source text object type, and a source raster graphic object type;
a destination data output for providing destination color data represented in a second device dependent color space having only three primary color components and including a virtual black color component defined by substantially equal tonal values of each of the three primary color components;
a memory for storing a first multidimensional gamut mapping of the first device dependent color space to a device independent color space having a neutral color component, and a second multidimensional gamut mapping of the device independent color space to the second device dependent color space, the second multidimensional gamut mapping including a mapping from the neutral color component of the device independent color space to the virtual black color component of the second device dependent color space; and
at least one processor coupled to the memory, the at least one processor including a first processor and a second processor, the first processor configured to convert the source color data to intermediate color data represented in the first device independent color space using the first multidimensional gamut mapping, and to convert the intermediate color data to the destination color data using the second multidimensional gamut mapping;
wherein, for source data corresponding to the virtual black color component, the second processor is configured to
screen a first portion of the destination color data representing the source text object type into gray halftone data including a single bit corresponding to each of the three primary color components of the second device dependent color space and a single bit corresponding to the virtual black color component;
screen a second portion of the destination color data excluding the first portion into color halftone data including a single bit corresponding to each of the three primary color components of the second device dependent color space and a single bit corresponding to the virtual black color component;
render the gray halftone data into at least one pure black output pixel to be printed using a black colorant; and
render the color halftone data into at least one process black output pixel to be printed using at least one non-black colorant.

13. The system of claim 12, wherein the second processor is further configured to set at least one K bit, stored in the memory and associated with the at least one pure black output pixel, to ON and reset at least one CMY bit, stored in the memory and associated with the at least one pure black output pixel, to OFF, and set at least one CMY bit, stored in the memory and associated with the at least one process black output pixel, to ON and reset at least one K bit, stored in the memory and associated with the at least one process black output pixel, to OFF.

14. The system of claim 12, wherein the source color data includes printer definition language (PDL) instructions, wherein the PDL includes at least one of PCL 5 and PCL 6, and wherein the at least one processor is further configured to interpret the PDL instructions.

15. The system of claim 14, wherein the second processor is further configured to perform a three-color rendering operation (ROP3) on at least a portion of the gray halftone data, and perform the ROP3 on at least a portion of the color halftone data.

16. The system of claim 12, wherein the at least one processor is further configured to adjust the mapping from the neutral color component of the device independent color space to the virtual black color component of the second device dependent color space in the second multidimensional gamut mapping based on a comparison to be performed between measured tonal values of each of a first plurality of printed neutral color pure black output pixels and a second plurality of printed neutral color process black output pixels, and a predetermined scale of neutral color tonal values.

17. The system of claim 12, wherein the first multidimensional gamut mapping includes a first three-dimensional look-up table (LUT), and wherein the second multidimensional gamut mapping includes a second three-dimensional LUT.

18. The system of claim 17, wherein the first three-dimensional LUT includes an RGB color space to L*a*b* color space LUT, and wherein the second three-dimensional LUT includes an L*a*b* color space to CMY color space LUT.

19. The system of claim 12, wherein the first processor is configured to convert the source color data to the intermediate color data and convert the intermediate color data to destination color data are performed by accessing a concatenated three-dimensional look-up table (LUT) corresponding to a concatenation of the first multidimensional gamut mapping and the second multidimensional gamut mapping.

20. The system of claim 19, wherein the concatenated three-dimensional LUT is a device link table including an RGB color space to CMY color space LUT.

\* \* \* \* \*

UNITED STATES PATENT AND TRADEMARK OFFICE
CERTIFICATE OF CORRECTION

| | | |
|---|---|---|
| PATENT NO. | : 8,634,105 B2 | Page 1 of 1 |
| APPLICATION NO. | : 13/242385 | |
| DATED | : January 21, 2014 | |
| INVENTOR(S) | : Yu et al. | |

It is certified that error appears in the above-identified patent and that said Letters Patent is hereby corrected as shown below:

In the Specification

In Column 5, Line 39, delete "(e.g., G≈M≈Y)." and insert -- (e.g., C≈M≈Y). --, therefor.

Signed and Sealed this
Seventeenth Day of June, 2014

Michelle K. Lee
*Deputy Director of the United States Patent and Trademark Office*